DAVID A. YOUNG
MARTIN SUMMERFIELD
INVENTORS.

DAVID A. YOUNG
MARTIN SUMMERFIELD
INVENTORS.

BY
AGENT

April 9, 1946.　　D. A. YOUNG ET AL　　2,398,201
MOTOR
Filed May 6, 1943　　3 Sheets-Sheet 3

DAVID A. YOUNG
MARTIN SUMMERFIELD
INVENTORS.

BY
AGENT

Patented Apr. 9, 1946

2,398,201

UNITED STATES PATENT OFFICE 2,398,201

MOTOR

David A. Young, Pasadena, and Martin Summerfield, Arcadia, Calif., assignors to Aerojet Engineering Corporation, Azusa, Calif., a corporation of Delaware Application May 6, 1943, Serial No. 485,866

9 Claims. (Cl. 60—35.6)

Our invention pertains to jet propulsion and more particularly to apparatus and methods for controlling the flow of propellants to a jet motor.

Our invention relates to jet propulsion systems of the type including a jet propulsion motor and separate containers of liquid propellants with conduits for supplying the propellants separately to the jet motor. In this type of system the propellants are forced through the conduits by a force supplied from the pressure of an inert gas in an auxiliary tank. In accordance with our invention we regulate the supply of propellant to the motor by controlling the flow of the propellants through the conduits leading to the motor and simultaneously controlling the pressure in the propellant tanks.

A feature of our invention is the provision of a main control valve which regulates the fluid pressure to open both valves in the propellant feed conduits and to operate a valve in the pressure supply conduit. Another feature resides in the provision of means for retarding the application of the fluid pressure control force to one of the valve control elements to initially inject propellants into the combustion chamber at gradually increasing rates in order to avoid excessive initial thrust.

While our invention may be used in connection with the propulsion of a wide variety of different devices and vehicles, it is particularly useful in the propulsion of aircraft and therefore its advantages are herein described relative to such application. It is understood that our invention is not limited to aircraft alone. The advantages of our invention may be better understood from the following description taken in conjunction with the accompanying drawings wherein.

Figure 1:
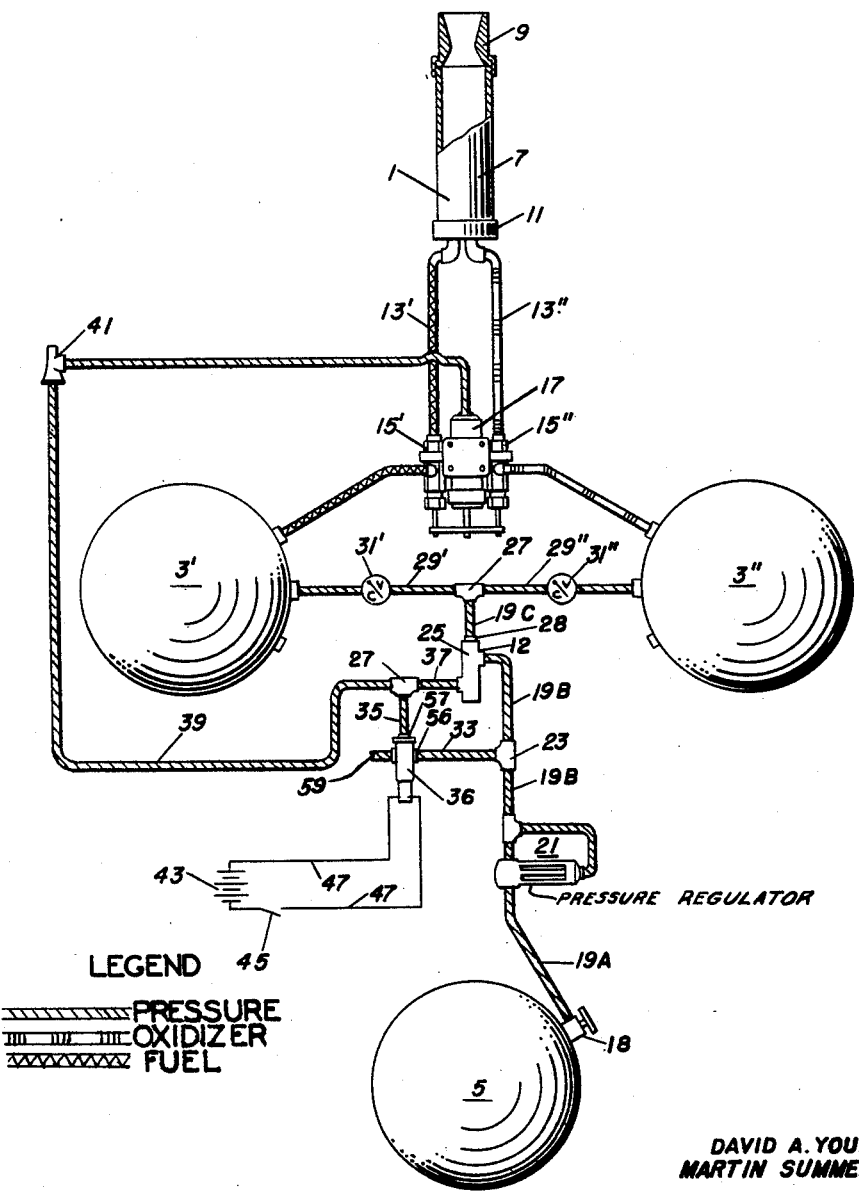
Fig. 1 is a schematic diagram of a jet propulsion system incorporating our invention.

In Fig. 1 we have shown a jet propulsion system comprising a jet motor 1, two propellant supply tanks 3' and 3" respectively containing a liquid fuel (such as aniline) and a liquid oxidizing agent (such as red fuming nitric acid) which are spontaneously combustible as more fully disclosed in copending application by John W. Parsons and Frank J. Malina Serial No. 486,236, filed May 8, 1943, and an auxiliary container 5 containing an inert gas (such as nitrogen) at a high pressure, say, 1800 p. s. i. (pounds per square inch). The jet motor 1 is of a type comprising a tubular body section 7 having a De Laval nozzle 9 mounted on the rear end thereof and a propellant injector 11 mounted on the front end thereof. The tubular body section, injector, and nozzle form a combustion chamber open to the surrounding medium through the throat of the nozzle. The injector has a pair of propellant injection orifices communicating with the combustion chamber and which also communicate with the respective propellant tanks 3' and 3" through corresponding dispensing conduits 13' and 13".

Figure 5:
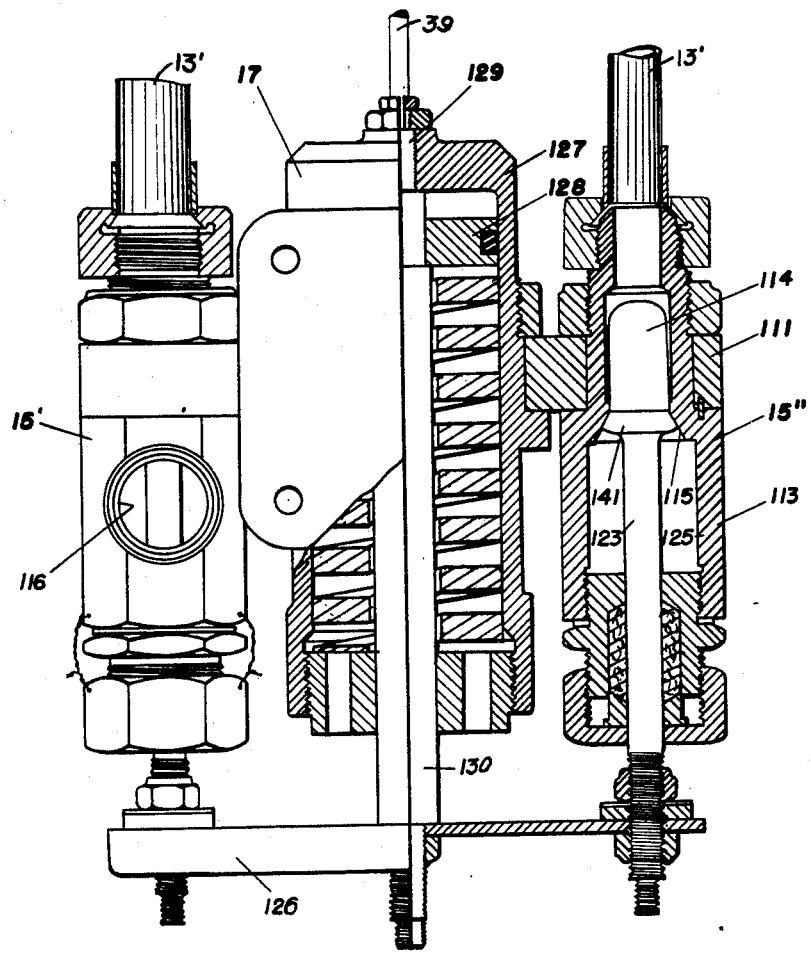
Fig. 5 is a plan view, partly in cross-section of a preferred propellant control valve.

Each of said conduits 13' and 13" includes one of a pair of valves 15' and 15" synchronously operable as set forth in the copending application Serial No. 486,077, filed May 7, 1943, by Martin Summerfield. The degree of opening of these two valves may be regulated by a pneumatic control element 17 and thus the rate of injection of the propellants into the jet motor is controlled in a predetermined manner. The propellant control valves 15' and 15" and the valve control element 17 are preferably constructed as a single unit as shown in Fig. 5.

In the wall of the nitrogen tank there is a hand valve 18 which connects a main pressure line having a first section, a second or midsection, and an end section, 19A, 19B and 19C respectively connected in the line, in the order named, beginning from the hand valve 18. This main line includes a pressure regulator 21 separating the first section 19A from the second section 19B, a T-connection 23 in the second section connecting to a branch 33 of the main pressure line. The midsection terminates in an inlet 12 of a pressure line control valve 25, the outlet 28 of which connects with the end section 19C. The branch line 33 terminates in an inlet 57 of a main control valve 36. The end section 19C terminates in a T-connection 27 to which there are connected two branch lines 29' and 29" which communicate with the fuel and oxidizer tanks 3' and 3" respectively. The latter lines include check valves 31' and 31" respectively to prevent any possible back-flow of propellants from the tanks into the end section 19C of the main pressure line. The main control valve 36 is remotely controllable and preferably of the electromagnetic type and communicates with a main control line 35 at the valve outlet 56. The main control line 35 connects with a first branch control line 37 through which pressure may be applied to a pneumatic control element to actuate the pressure line control valve 25 and open the mid-section 19B to the end section 19C of the main pressure line. The main control line 35 also connects through a second branch control line 39 which connects with a pneumatic control element 17 of the propellant control valve unit. The branch control line 39 includes means, such as a restrictor 41, which operates to retard the application of fluid pressure to the pneumatic control element 17 compared with the speed of application of such pressure to the pressure line control valve 25 through the branch control line 37.

The propellant control valves 15' and 15'' and the pressure line control valve 25 are preferably of the normally closed type.

The main control valve 36 is preferably electromagnetically controlled by the application of current from a battery 43 to a switch 45 through associated electrical conductors 47, 47 connected to a field coil in the main control valve.

With the current off the main control valve 36 closes the line 33 and opens the main control line 35 to the atmosphere through a vent 47 thus closing the pressure line valve 25 and the propellant flow control valves 15' and 15''. When current flows through the field coil of the valve the vent is closed off and the branch 33 of the main pressure line communicates with the main control line 35 thus permitting gas at high pressure to flow to the pneumatic control elements of the pressure line control valve 25 and the propellant control valve unit. Due to the action of the restrictor 41 the application of pressure to the propellant valve control element 17 is retarded and the propellant flow control valves 15' and 15'' consequently open gradually.

In order to facilitate understanding the operation of the jet propulsion system shown in Fig. 1, a main control valve 36, a pressure line control valve 25, a restrictor 41, and a propellant control valve unit 17 will now be described in greater detail.

Figure 2:
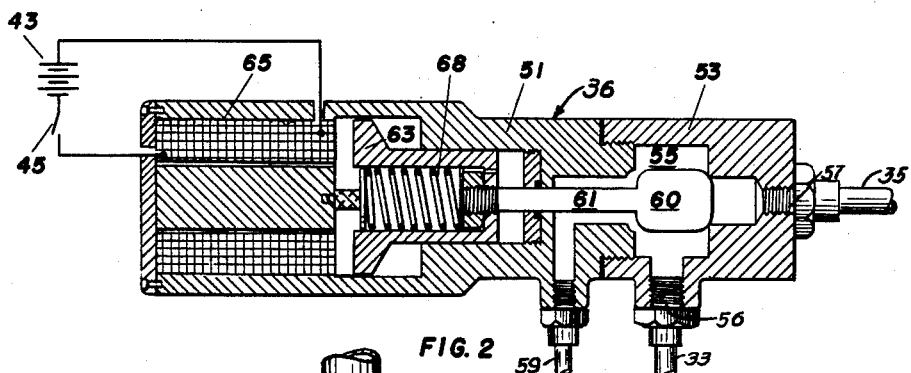
Fig. 2 is a side elevation partly in cross section of a three-way electromagnetically controlled globe valve useful as a main control valve.

An electromagnetically actuated main control valve of the type which we prefer to use is shown diagrammatically in Fig. 2. This valve assembly has a main cylindrical body section 51 and an end section 53 threaded thereon and which together form a valve chamber 55. The valve chamber communicates with an outlet 57 passing through the end section 53. The valve chamber also communicates with an inlet 56 and a vent 59.

A globe shaped valve head 60, mounted within the chamber, is supported at one end of a valve stem 61 extending through the chamber 55 wall at a point axially aligned with the valve outlet 57. When the current is off, the valve head is normally urged by a stiff spring 68 toward the opening to the outlet 57 which is thereby closed. When the current is on, the valve head closes the opening to the vent 59 and permits fluid to flow from the valve inlet 56 through the chamber 55 and out of the outlet 57.

On the end of the valve stem which is external to said valve chamber 55 there is secured an armature 63 which may be displaced axially by passing electrical current to the field coil 65 mounted within a chamber at the end of the valve remote from the valve inlet. The inlet connects with the main pressure branch line 33; the outlet 57 connects with the main control line 35 and the vent outlet 59 connects with the vent 47 as shown schematically in Fig. 1.

Figure 3:
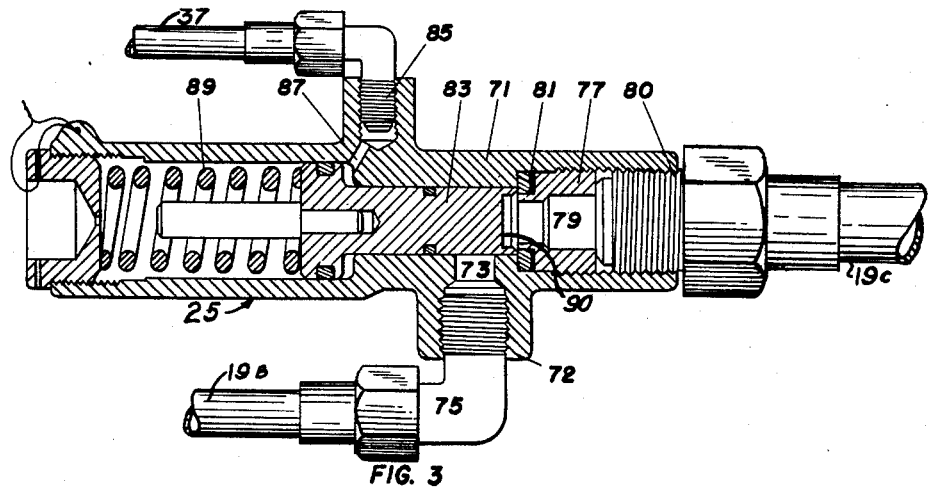
Fig. 3 is a side elevation, partly in section, of a pressure line control valve.

A form of main pressure line control valve 25 suitable for our purposes is shown in Fig. 3. This valve comprises a generally cylindrical body 71 which has a passage extending axially from one end to the other. The mid-section of this passage is cylindrical and is of a smaller diameter than either cylindrical end section and communicates through a side opening 73 through an elbow connector 75 with the mid-section of the main pressure line 19B.

At one end of the opening there is a threaded insert 77 which has an axial passage 79 extending therethrough forming an outlet 80. This insert holds a flexible annular valve seat 81 against the adjacent end of the smaller cylindrical section of the passage extending through the valve.

A piston 83 longer than said middle cylindrical section fits into said section. This piston has a sharply tapered annular ring 90 at the valve seat end thereof. At the other end it has an enlarged piston section which fits in the larger portion of the cylindrical passage at that end of the valve.

The face of this enlarged piston adjacent the smaller piston section communicates with an opening 85 forming a passage 87 through the wall of the valve. The piston is normally urged toward the outlet 79 by a spring 89 and in this position closes the valve inlet 73. When gas under pressure is admitted to the side opening 85 from the branch 37 of the control line the piston is forced against said spring and operates to open the inlet 73 connected to the branch 19B of the main pressure line 19A, thereby permitting gas to flow under pressure through the outlet 79 and into the control line 19C.

Figure 4:
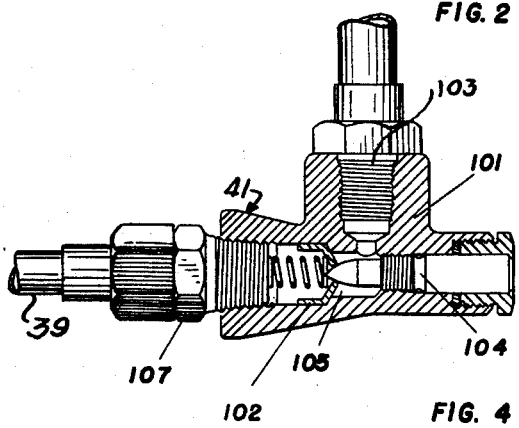
Fig. 4 is a side elevation, partly in cross-section of a restrictor adapted to retard the application of fluid pressure control forces to the propellant control valves.

We prefer to use a restrictor 41 of the one-way type in the control line 39. Such a restrictor (shown in Fig. 4) has a body portion 101 having a side branch including an opening 103 and two end openings in one of which is an adjustable tapered screw 104 and in the other of which there is arranged means for urging a valve plate 102 having an orifice therein against a shoulder at the side of a central chamber 105. The end including the valve plate is connected to the high pressure side of the branch control line 39 which communicates with the propellant valve unit. The side branch 103 connects with the low pressure side of said branch line. In normal operation the tapered end of said screw is positioned opposite and extends partly into the orifice of the valve plate. When gas flows through such a restrictor from the inlet end, it flows slowly because of the narrow passage between the valve plate and the tapered end of the screw. On the other hand when gas flows in the opposite direction, the valve plate is displaced from the tapered end, permitting gas to flow rapidly in this direction. Because of this feature the flow of propellants to the combustion chamber may be initiated slowly and be shut off sharply.

The propellant control valve unit 17 shown in Fig. 5 comprises the fuel valve 15', the oxidizer valve 15'', and the pneumatic control element 17 rigidly supported by a cross piece 111 with the control valves symmetrically arranged about the axis of the pneumatic control element. Both propellant control valves are of the pintle type. Each comprises a body 113 forming a cylindrical chamber 125 and having a tapered seat 115, at the junction between the cylindrical chamber and the valve outlet. Each valve head is supported at one end of a corresponding valve stem 123 which extends through a sealed end of the valve. The valve chamber 125 of each valve is located between said seal and said tapered seat 115. This chamber communicates through a corresponding side opening 116 to the section of a dispensing conduit (supply line) which is connected to the corresponding propellant container and the outlet communic..tes with the section of such conduit which connects to one of the propellant injection orifices. An elongated section 114 of the valve head extends into the outlet section and an enlarged section on the head 141 is positioned within the valve chamber and seats against said body seat 115 when the valve is in a closed position.

The rate at which a propellant may flow in such line through the valve past the elongated section of the valve head and into the combustion chamber depends upon the displacement of the valve stem with respect to the valve body 113. To control such displacement the two valve stems are interconnected by a control link 126 rigidly secured to the external ends of the valve stems 123. The pneumatic control element 17 comprises a body 127 including a cylinder which is closed at one end except for a port 129 which may be connected to the branch control line 39. A spring loaded piston 128 is slidably arranged within this cylinder and is secured to one end of a shaft 130, the other end of which shaft is secured rigidly to said link 126.

Operation

When the jet propulsion unit is prepared for operation an inert gas is introduced to the auxiliary container 5 at a high pressure, for example 1500 to 2000 lbs./sq. in., through a suitable connector in the wall of the auxiliary container. Fuel may be introduced into the fuel container 3' by temporarily removing the safety plug in the wall of this container. Oxidizer may be similarly introduced into the oxidizer container 3".

The pressure regulator 21 is so designed that it produces a pressure of about 500 lbs./sq. in., on the low pressure side of the pressure feed line 19. Gas at this pressure is introduced through the inlet 12 of the valve 25, but when no current is flowing to valve 25, flow of gas into the main control line 35 is prevented. At this time the control lines 35, 37, and 39 communicate to the atmosphere through the valve chamber 55, and the vent 59 and 47.

In this condition the pressure line control valve is closed as are also the two valves 15' and 15". When it is desired to produce thrust with the jet motor, switch 45 is closed thus actuating the main control valve 36 and admitting nitrogen gas at a pressure of about 500 lbs./sq. in., to the control lines 35, 37, and 39. The force produced on the piston 83 by the introduction of such gas into the control element of valve 25 opens said valve rapidly and allows nitrogen to flow into the branch lines 29' and 29" which communicate with the propellant containers 3' and 3". At the same time gas begins to leak gradually through the restrictor 41 and as it does so the increasing force applied to the piston of the pneumatic control unit 17 of the propellant control valve unit, thus lifting the valve heads 141 of the propellant control valves 15' and 15" slowly from the seats 115 and permitting propellants to flow as separate streams at gradually increasing rates into the jet motor combustion chamber through corresponding orifices in the injector 11.

The propellants react in the combustion chamber with the liberation of a large amount of heat. The gases and vapors present in the chamber or produced there as a result of combustion, quickly fill the chamber with such gases and vapors at high temperature and pressure. As the pressure rises in the chamber and the propellant control valves 15' and 15" gradually open the increase in pressure in the combustion chamber counteracts to some extent the effect of the increasing valve opening. The propellants flow into the combustion chamber at gradually increasing rates until the rates of flow reach the value corresponding to the total pressure drop existing between the propellant tanks and the combustion chamber under normal operating conditions with the propellant control valves 15' and 15" completely open.

Figure 6:
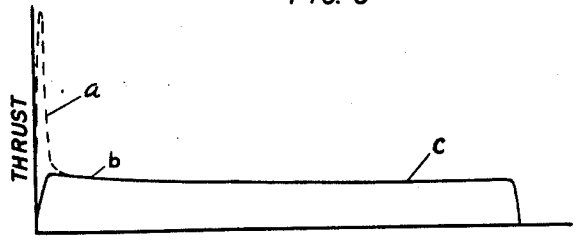
Fig. 6 is a graph used in representing the variations of jet propulsion thrust with time, with and without our invention.

The effect of the gradual opening of the propellant valves on the variations of thrust with time as compared to the manner in which the thrust would vary with time if the propellant control valves were suddenly opened is brought out in Fig. 6. In this graph ordinates represent thrust and abscissae represent time.

If the valves were completely opened suddenly, a pressure drop equal to the difference between the regulated pressure and the atmospheric pressure initially present in the combustion chamber (which drop in the case referred to here would represent a pressure differential of about 480 lbs.) would drive the propellants rapidly into the combustion chamber and thereby produce a correspondingly large thrust. The large initial thrust that might exist under these conditions is here represented by the high initial peak of the dotted curve $a$. As the pressure in the chamber increases, the rate of injection of propellants would decrease and the thrust would decrease in a corresponding amount until it reached a constant level $c$ corresponding to steady state operation of the jet propulsion unit. Such a rapid rise to a large thrust could be injurious to the motor, to the airplane on which it is mounted, or to the supports holding the motor in place on the airplane. When thus operated the motor may be subjected to a peak thrust as much as two to four times the normal rated thrust.

By operating the jet propulsion system in accordance with our invention the absence of a high pressure in the combustion chamber during the initial operation of the jet propulsion unit is compensated for by slowly opening the propellant control valves 15' and 15" thereby impeding the flow of propellants to the combustion chamber during the initial stage of operation. By properly proportioning the retardation action of the restrictor 41 to the dimensions of the propellant control valves in accordance with the energy producing properties of the propellants, and the required characteristics of the motor, the production of excessively high thrust during the initial operating period may be avoided and the maximum thrust produced during the entire operating period limited to a value substantially equal to (not more than about 25% greater than) the normal rated thrust. Since a jet propulsion system operated in accordance with our invention need not be designed to withstand thrusts several times greater than the rated thrust, we are able to achieve an increase in the thrust per unit weight of jet propulsion systems.

We claim as our invention:

1. In a fluid control system, the combination of: a source of fluid under pressure; a container adapted for the storage of liquid; a fluid pressure conduit connecting said source to said container; a dispensing conduit connected to said container; pressure actuated first valve means in said fluid pressure conduit; pressure actuated second valve means in said dispensing conduit; a control conduit connecting said source to both of said valve means; a control valve in said control conduit whereby fluid under pressure is supplied from said source to both of said valve means to actuate them to open position when said control valve is open, said control valve being adapted in closed position for discharging to the atmosphere fluid under pressure from said control conduit between said first valve and said second valve means; and means in said control conduit between said control valve and said second valve means in said dispensing conduit adapted for retarding the application to said second valve means in said dispensing conduit of fluid pressure upon the opening of said control valve whereby fluid pressure is applied gradually to said second valve means in said dispensing conduit.

2. In a fluid control system, the combination of: a source of fluid under pressure; a container adapted for the storage of liquid; a fluid pressure conduit connecting said source to said container; a dispensing conduit connected to said container; pressure actuated first valve means in said fluid pressure conduit; pressure actuated second valve means in said dispensing conduit; a control conduit connecting said source to both of said valve means; a control valve in said control conduit whereby fluid under pressure is supplied from said source to both of said valve means to actuate them to open position when said control valve is open, said control valve being adapted in closed position for discharging to the atmosphere fluid under pressure from said control conduit between said control valve and said first valve means; and means in said control conduit between said control valve and said second valve means in said dispensing conduit adapted for retarding the application to said second valve means in said dispensing conduit of fluid pressure upon the opening of said control valve whereby said first valve means in said fluid pressure conduit is actuated more rapidly than said second valve means in said dispensing conduit.

3. In combination a jet motor: a plurality of containers of liquid propellants; an auxiliary container of fluid under pressure; a fluid conduit connecting each of said containers to said auxiliary container; first valve means in said conduit adapted for controlling the passage of fluid; first valve control means associated with said first valve means; a dispensing conduit connecting each of said plurality of containers to said jet motor; second valve means adapted for controlling the passage of liquid through each of said dispensing conduits; second valve control means so associated with said second valve means as to actuate said second valve means in all of said dispensing conduits simultaneously; a control conduit connecting said first and second valve control means to said auxiliary container, said first and second valve control means being adapted for actuating said valve means associated therewith to open position when fluid pressure is supplied to said first and second valve control means; and a control valve in said control conduit adapted for controlling the passage of fluid therethrough.

4. In combination a jet motor: a plurality of containers of liquid propellants; an auxiliary container of fluid under pressure; a fluid conduit connecting each of said containers to said auxiliary container; first valve means in said conduit adapted for controlling the passage of fluid therethrough; first valve control means associated with said first valve means; a dispensing conduit connecting each of said plurality of containers to said jet motor; second valve means adapted for controlling the passage of liquid through each of said dispensing conduits; second valve control means so associated with said second valve means as to actuate said second valve means in all of said dispensing conduits simultaneously; a control conduit connecting said first and second valve control means to said auxiliary container, said first and second valve control means being adapted for actuating said valve means associated therewith to open position when fluid pressure is supplied to said first and second valve control means; a control valve in said control conduit adapted for controlling the passage of fluid therethrough; and restricting means in said control conduit adapted for retarding the application of fluid pressure to one of said first and second valve control means upon opening of said control valve.

5. In combination a jet motor: a plurality of containers of liquid propellants; an auxiliary container of fluid under pressure; a fluid conduit connecting each of said containers to said auxiliary container; first valve means in said conduit adapted for controlling the passage of fluid therethrough; first valve control means associated with said first valve means; a dispensing conduit connecting each of said plurality of containers to said jet motor; second valve means adapted for controlling the passage of liquid through each of said dispensing conduits; second valve control means so associated with said second valve means as to actuate said second valve means in all of said dispensing conduits simultaneously; a control conduit connecting said first and second valve control means to said auxiliary container, said first and second valve control means being adapted for actuating said valve means associated therewith to open position when fluid pressure is supplied to said first and second valve control means; and a control valve in said control conduit adapted for controlling the passage of the fluid therethrough, said control valve being adapted for connecting said first and second valve control means to the atmosphere when said control valve is in closed position; and restricting means in said control conduit adapted for retarding the application of fluid pressure to one of said valve control means relative to the other of said valve control means upon opening of said control valve.

6. In combination a jet motor: a receptacle containing fluid under pressure; a plurality of containers of liquid propellants; a fluid conduit connecting each of said containers to said receptacle; first valve means in said conduit adapted for controlling the passage of fluid therethrough; a dispensing conduit connecting each of said containers to said jet motor; second valve means in each of said dispensing conduits adapted for controlling the passage of liquid therethrough; valve control means so associated with said second valve means as to actuate said second valve means in all of said dispensing conduits synchronously; a control conduit connecting said first valve means and said valve control means to said receptacle, said first and second valve means being adapted for actuation to open position when fluid pressure to said first valve means and said valve control means is changed; and a control valve in said control conduit adapted for controlling the passage of fluid therethrough.

7. In combination a jet motor: a receptacle containing fluid under pressure; a plurality of containers of liquid propellants; a fluid conduit connecting each of said containers to said receptacle; a dispensing conduit connecting each of said containers to said jet motor; valve means in each of said dispensing conduits adapted for controlling the passage of liquid therethrough; valve control means so associated with said valve means as to actuate said second valve means in all of said dispensing conduits synchronously; a control conduit connecting said valve control means to said receptacle, said valve means being adapted for actuation to open position when fluid pressure at said valve control means is changed; a control valve in said control conduit adapted for controlling the passage of fluid therethrough; and fluid flow restricting means in said control conduit between said control valve and said valve control means and adapted for retarding such a change of fluid pressure at said valve control means upon actuation of said control valve.

8. In combination a jet motor: a receptacle containing fluid under pressure; a plurality of containers of liquid propellants; a fluid conduit connecting each of said containers to said receptacle; first valve means in said conduit adapted for controlling the passage of fluid therethrough; a dispensing conduit connecting each of said containers to said jet motor; second valve means in each of said dispensing conduits adapted for controlling the passage of liquid therethrough; valve control means so associated with said second valve means as to actuate said second valve means in all of said dispensing conduits sychronously; a control conduit connecting said first valve means and said valve control means to said receptacle, said first and second valve means being adapted for actuation to open position when fluid pressure supplied to said first valve means and said valve control means is changed in a given direction; and a control valve in said control conduit adapted for controlling the passage of fluid therethrough, said control valve being adapted for venting said first valve means and said valve control means when said control valve is in closed position; and restricting means in said control conduit between said control valve and said valve control means and adapted for retarding a change of fluid pressure to said valve control means upon actuation of said control valve.

9. In a fluid control system, the combination of a source of fluid under pressure, containers adapted for the storage of fluid, a fluid pressure pipe connecting said source to said containers, dispensing conduits attached to said containers, a pressure actuated first valve means in said fluid pressure conduit, a pressure actuated second valve means in said dispensing conduits, a control conduit conveying the pressure from the source to the first and second valve means, a control valve in the control conduit for delivering the pressure to operate the first and second valve means, and means for delaying the delivery of operating pressure to the second valve means until after the operating pressure has been delivered to the first valve means.

DAVID A. YOUNG.
MARTIN SUMMERFIELD.